(12) United States Patent
Diaz Fuente et al.

(10) Patent No.: US 8,755,263 B2
(45) Date of Patent: *Jun. 17, 2014

(54) DEVICE AND METHOD FOR THE OPTIMAL ESTIMATION OF DISTORTION OF A TRANSMISSION MEDIUM, COMPRISING THE SEQUENTIAL EMISSION OF PAIRS OF QUADRATURE COMPLEMENTARY SEQUENCES

(76) Inventors: Vicente Diaz Fuente, Alcala de Henares (ES); Daniel Hernanz Chiloeches, Alcala de Henares (ES); Jesus Berian Mugica, Alcala de Henares (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,334

(22) Filed: Apr. 8, 2011

(65) Prior Publication Data

US 2011/0211653 A1 Sep. 1, 2011

Related U.S. Application Data

(63) Continuation of application No. 11/587,680, filed as application No. PCT/ES2005/000228 on Apr. 29, 2005, now Pat. No. 7,995,456.

(30) Foreign Application Priority Data

May 28, 2004 (ES) ............................... 20040001299

(51) Int. Cl.
*H04J 11/00* (2006.01)
(52) U.S. Cl.
USPC .......................................... 370/206; 375/298
(58) Field of Classification Search
USPC ................... 370/203, 206, 208; 375/243, 298; 455/59, 60
See application file for complete search history.

(56) References Cited

U.S. PATENT DOCUMENTS

| 6,404,732 B1 | 6/2002 | van Nee | |
|---|---|---|---|
| 6,661,854 B2 | 12/2003 | Rudolf et al. | |
| 6,795,513 B2 | 9/2004 | Jechoux et al. | |
| 7,339,170 B2 | 3/2008 | Deliwala | |
| 7,372,910 B2 * | 5/2008 | Suh et al. | 370/203 |
| 7,483,367 B2 | 1/2009 | Chayat et al. | |
| 2004/0202103 A1 * | 10/2004 | Suh et al. | 370/208 |

FOREIGN PATENT DOCUMENTS

| EP | 1237313 A1 | 9/2002 |
|---|---|---|
| EP | 1311095 B1 | 5/2003 |

* cited by examiner

*Primary Examiner* — Kerri Rose

(57) ABSTRACT

The present invention relates to a device and method for optimal estimation of the distortion caused by the transmission medium by means of the sequential emission of pairs of quadrature complementary sequences, estimating the frequency spectrum of a transmission channel allows obtaining information of considerable interest to analyze its characteristics or correcting the distortion effects introduced in a communication system. This invention describes a new method for extracting said characteristics generating a transmission preamble using complementary sequences, which allows upon reception identifying the distortion caused in each of the I/Q phases of a quadrature modulation system on the transmitted symbols, canceling the phase distortion effects caused by the medium and reducing the equalization of the channel to a single equalizing baseband filter identical for both I2/Q2 phases. Since the distorted frequencies are received in the receiver, they also allow extracting the temporal and/or frequency characteristics of the distortion caused by the medium they traverse with a precision depending on the length of the sequences used in coding.

20 Claims, 2 Drawing Sheets

DEVICE AND METHOD FOR THE OPTIMAL ESTIMATION OF DISTORTION OF A TRANSMISSION MEDIUM, COMPRISING THE SEQUENTIAL EMISSION OF PAIRS OF QUADRATURE COMPLEMENTARY SEQUENCES

CROSS-REFERENCE TO RELATED APPLICATIONS

This application is a continuation of U.S. patent application Ser. No. 11/587,680, which is the national stage of PCT/ES05/00228, international filing date 29 Apr. 2005, which claims priority of Spanish Patent Application No. P 200401299, filed 28 May 2004, each of which is incorporated by reference in its entirety herein.

OBJECT OF THE INVENTION

The present invention relates to a modulation and demodulation device and method, as well as the transmitter and receiver, allowing the estimation of the temporal characteristics and frequencies of any transmission medium by means of the use of complementary sequences.

BACKGROUND OF THE INVENTION

Communication systems, spectral analysis, RADAR and SONAR transmit a signal which reaches, either reflected or not, the receiver after having traversed a transmission medium. This medium behaves like a linear filter with a response to the frequency $H(\omega)$ or temporal $h[n]$ impulse. To enable the process of recovering the emitted information, most communication systems make it indispensable to eliminate the effects caused by the transmission medium on the emitted signal $s[n]$. This process is known as equalization. The response in frequency can also be used to carry out spectral analysis of the medium and to thus obtain information on the physical properties thereof.

The channel acts as a filter and distorts the signal. Noise $n[n]$ due to perturbations in the channel, thermal noise or other signals interfering with the emitted signals, must be considered. In conclusion, the received signal $r[n]$ can be modeled as:

$$r[n]=s[n]*h[n]n[n] \quad (1)$$

where * represents the convolution operation. A filter with impulse response $f[n]$ is required to eliminate the distortion introduced by the medium in the signal, such that:

$$r[n]*f[n] \approx s[n] \quad (2)$$

In other words, the received signal must be as similar as possible to the emitted signal. This requirement can never be fully met due to the fact that neither noise $n[n]$ nor distortion is completely eliminated.

In order for equalization to be the best possible equalization, it is necessary to know the medium a priori. In other words, it is necessary to analyze $h[n]$ of the medium to be able to counteract the distortion effects. There are two methods for achieving this objective:

Static equalizers: their properties do not change over time.
Adaptive equalizers: they are adapted to temporal variations of the distortion of the medium.

The main problem with the first equalizers is that they are more generic and do not solve the particular problems of each situation. Adaptive equalizers respond better to variations of the medium, but their implementation is more complicated and they are very sensitive to noise.

For both equalizers it is still indispensable to know the transmission medium. The better the modulation of the transmission medium, the greater the precision that will be obtained when restoring the emitted signal. The ideal method for analyzing the medium consists of transmitting a delta and analyzing the received signal, i.e. obtaining the impulse response. This is achieved at the digital level by emitting a Krönecker delta $\delta[n]$:

$$s[n]=\delta[n]$$

$$r[n]=h[n]+n[n] \quad (3)$$

As can be observed, the received signal has information on the impulse response $h[n]$ contaminated with additive noise.

The need for a technique allowing on one hand efficiently emitting a Krönecker delta, and on the other reducing the noise of the received signal, can be deduced from the foregoing. Sending a Krönecker delta directly is very complex because it requires high peak power. As will be seen, a very precise model of the transmission medium and the distortion it causes can be obtained by maintaining these two premises.

The characteristics extracted from the model of the medium can be used to equalize same in communications applications, or to analyze the physical characteristics thereof, as is the case of discriminating between different types of objectives in SONAR and RADAR systems, or carrying out spectral analyses for extracting physical-chemical properties, as is used in spectroscopy.

No patent or utility model the features of which are the object of the present invention is known.

OBJECT OF THE INVENTION

The invention herein described uses sets of M complementary sequences. By complementary it is understood that the sum of the autocorrelations results in a Krönecker delta. The value of M also coincides with the number of sets of complementary sequences which are orthogonal to one another. By orthogonal it is understood that the sum of the cross-correlations of the complementary sequences of each set is zero. In the particular case of pairs (M=2) of orthogonal sequences, they are called as Golay sequences after the person who discovered them. (These concepts are discussed in the article published by Tseng, C. C. and Liu, C. L.: "Complementary Sets of Sequences", in IEEE Trans. Inform. Theory, vol. IT-18, No. 5, pp. 644-652, September 1972). The explanation will be focused on Golay sequences because it is the simplest case, although the patent can be extended for any value of M.

The main property of the sequences used in this invention is that they have an ideal autocorrelation characteristic, i.e. it corresponds to a perfect Krönecker delta such that:

$$\phi_{11}[n] + \phi_{22}[n] + \ldots + \phi_{MM}[n] = \sum_{i=1}^{M} \phi_{ii}[n] = \begin{cases} ML, & n = 0 \\ 0, & n \neq 0 \end{cases} \quad (4)$$

where $\phi_{ii}$ are the individual correlations of each of the chosen M complementary sequences, having length L. Specifically regarding the case of pairs of Golay complementary sequences:

$$\phi_{A_1A_1}[n] + \phi_{B_1B_1}[n] = \begin{cases} 2, & n = 0 \\ 0, & n \neq 0 \end{cases} \quad (5)$$

where $\phi_{A1A1}[n]$ and $\phi_{B1B1}[n]$ are the autocorrelations of sequence A1 and B1, respectively, defined as:

$$\phi_{A1A1}[n] = \frac{1}{L}\sum_{k=1}^{L} A1[k]A1[k+n] \quad (6)$$

$$\phi_{B1B1}[n] = \frac{1}{L}\sum_{k=1}^{L} B1[k]B1[k+n]$$

Furthermore, there is always a pair of orthogonal complementary sequences (A2, B2) such that the sum of the cross-correlations is equal to zero for any n, i.e.:

$$\phi_{A1A1}[n]+\phi_{B1B1}[n]=0\,\forall n \quad (7)$$

where $\phi_{A1B2}[n]$ and $\phi_{B1B2}[n]$ are the cross-correlations of sequences A and B, respectively, of both pairs, defined as:

$$\phi_{A1A2}[n] = \frac{1}{L}\sum_{k=1}^{L} A1[k]A2[k+n] \quad (8)$$

$$\phi_{B1B2}[n] = \frac{1}{L}\sum_{k=1}^{L} B1[k]B2[k+n]$$

The following auxiliary properties are further met:

$$\phi_{A1A1}[n]+\phi_{A2A2}[n]=2\delta[n]$$

$$\phi_{B1B1}[n]+\phi_{B2B2}[n]=2\delta[n]$$

$$\phi_{A1A1}[n]-\phi_{B2B2}[n]=0\,\forall n$$

$$\phi_{A2A2}[n]-\phi_{B1B1}[n]=0\,\forall n \quad (9)$$

The generation of such sequences is carried out from the so-called basic kernels known up until now of 2, 10 and 26 bits (the rules for generating Golay sequences are discussed in the article entitled "Complementary Sequences" by M. J. E. Golay, published in IRE Transactions on Information Theory, vol. IT-7, pp. 82-87, April, 1961).

The system consists of two main blocks: a coder and a decoder. The coding system is responsible for generating the equalization preamble to be emitted with the corresponding complementary sequences in the order and by means of the steps defined in FIG. 2. In contrast, the decoder is responsible for correlating the received signals with the complementary sequences used in the emission and totaling the results as explained below.

The different M-QAM modulation/demodulation processes (and their digital and analog derivatives, M-PSK, QPSK, ASK, QASK, etc.) use two quadrature I and Q phases (except in PSK and ASK which only generally use a phase) which, when traversing a transmission medium, undergo phase and modulus distortion which are affected in different ways by the medium, causing mutual inter-phase interference. The demodulation process is not the object of this document, therefore demodulated baseband I and Q phases and will be worked with. For the purpose of being able to work theoretically with signals it is advisable to use a block diagram showing the process (FIG. 1).

It is well known that by using the properties of the transmitted complementary sequences it is possible to estimate the transfer function distorting the received data. The diagram also shows that the signals received after demodulating both baseband phases correspond to the following equations in the frequency domain. For the purpose of clarity, is omitted from the expressions:

$$AH_I+Bi_{QI}+N_I=I$$

$$BH_Q+Ai_{IQ}+N_Q=Q \quad (10)$$

where A and B are the sequences sent by each of the quadrature phases, I and Q, respectively, $H_Q$ and $H_I$ correspond to the distortion function of the channel on the Q and I phase, respectively, due to the amplitude distortion of the channel, and $i_{IQ}$ and $i_{QI}$ are the interference functions of the channel I on Q and vice-versa due to the phase distortion of the channel, the noise received in both phases is different an is reflected in the terms $N_I$ and $N_Q$. The phase distortion caused by the channel on the data causes interference between both phases. If the preamble defined in FIG. 2 is transmitted, mutual interferences can be eliminated and it is possible to separate I from B and Q from A, performing the following filtering operation (assuming that there are no noise terms), which is described in FIG. 3:

$$(AH_I+Bi_{QI})H_Q-(BH_Q+Ai_{IQ})i_{QI}=A(H_IH_Q-i_{IQ}i_{QI})$$
$$=AH=I2$$

$$(BH_Q+Ai_{IQ})H_I-(AH_I+Bi_{QI})i_{IQ}=B(H_IH_Q-i_{IQ}i_{QI})$$
$$=BH=Q2 \quad (11)$$

where $$H = \frac{1}{H_{eq}} = H_IH_Q - i_{IQ}i_{QI} \quad (12)$$

corresponds to the filter to be equalized and $H_{eq}$ is the equalizing filter common to both phases and can be implemented with any current channel equalization method. Two new independent signals I2 and Q2 are thus obtained and they depend only on the sequences that are to be received. By means of two identical filters it is thus possible to equalize both phases recovering the transmitted information with no distortion.

It is evidently necessary to identify the filters $H_I$, $H_Q$, $i_{IQ}$ and $i_{QI}$. It can be easily demonstrated that said filters are obtained from the received baseband I and Q signals (FIG. 4) operating by means of correlation operators defined in equations (6) and (8) with sequences A, B and $A_c$, $B_c$ and applying the defined properties of the complementary sequences as follows:

$$H_I=IA1+IA2+N_I/2L$$

$$H_Q=QB1+QB2+N_Q/2L$$

$$i_{IQ}=QA1+QA2+N_Q/2L$$

$$i_{QI}=IB1+IB2+N_I/2L$$

Using FIG. 4 as a reference, IA1 will correspond to the correlation of I phase with the A1 sequence in the interval defined by IA1, IA2 will correspond to the correlation of the samples of phase I with the A2 sequence in the interval defined by IA2, QB1 will correspond to the correlation of the Q phase with the B1 sequence in the interval defined by QB1, QB2 will correspond to the correlation of the samples of the Q phase with the B2 sequence in the interval defined by QB2, QA1 will correspond with the correlation of the Q phase with the A1 sequence in the interval defined by QA1, QA2 will correspond to the correlation of the Q phase with the A2 sequence in the interval defined by QA2, TB1 will correspond to the correlation of the I phase with the B1 sequence in the interval defined by IB1, and IB2 will correspond to the correlation of the samples of the I phase with the B2 sequence in the interval defined by IB2. It is also observed that the nose is averaged and therefore its power is reduced as a result of the correlation functions by 2 L, where L is the length of the complementary sequences. This result is independent of the length of the sequences used for identification.

In conclusion, it can be asserted that the advantages of this technique are, on one hand, being able to estimate the transfer functions distorting the transmission medium in an optimal and independent manner for each phase, and on the other hand reducing according to L the effects of noise. Therefore, the described invention is a powerful system of estimating the distortion of the medium for use in equalization applications or simply for analyzing the frequency or electromagnetic spectrum characteristics of a given medium.

Digital signal of preamble to be emitted s[n]. At least deltas (δ[n]) separated by at least one distance of L symbols or sequence chips are sent to estimate the medium.

2. Coder with complementary sequences. Filter with convolution s[n] with the respective complementary sequences.

3. Result of convoluting the digital signal to be emitted with the complementary sequences according to the chronogram of FIG. 2 where the two I and Q phases are obtained.

4. Quadrature modulator in which both phases are totaled.

5. Quadrature modulated signal.

6. Frequency converter (up-converter) to send to the medium in the desired band.

7. Transmission medium being analyzed h[n]: this block includes the electronics necessary for modulating/demodulating, the transducer or antenna and the physical transmission medium.

8. Signals at the receiver input: these are the same emitted complementary sequences but distorted and affected by the noise of the channel.

9. Frequency converter (down-converter) to return the signal to its original band for the processing thereof.

10. Quadrature signal received.

11. Quadrature demodulator. It extracts the distorted baseband I and Q signals.

12. Demodulated baseband signals

13. Interference cancel filter of FIG. 3. It is initially programmed in by-pass mode and the coefficients are loaded when they are identified in 15.

14. Phases obtained after filtering.

15. Decoder: filters correlating the received phases with the same complementary sequences which were used for coding and in the same order, obtaining the information on the coefficients of the filters in 13.

16. Calculated coefficient loading process.

17. Received signal equalized at the end of the identification and filtering process.

Figure 2:
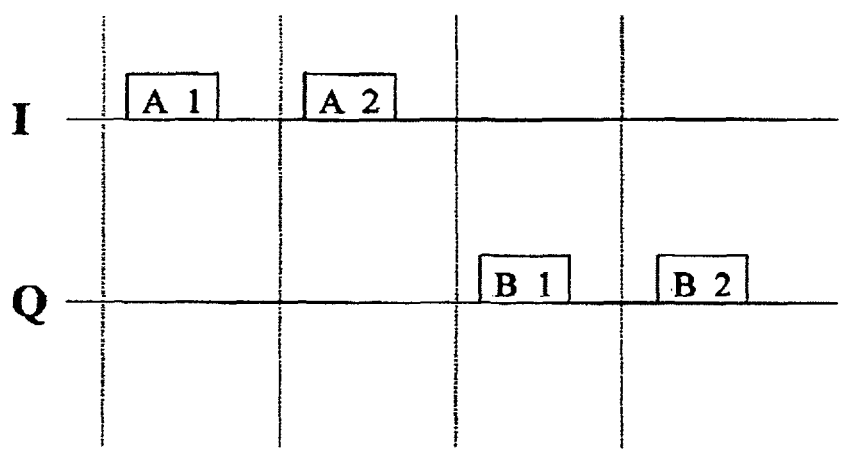

FIG. 2 shows the chronogram describing the transmission preamble and the sequences sent by each of the two I/Q quadrature phases which, by being quadrature modulated and totaled, will form a QAM (quadrature amplitude modulation) or, generically, QASK (quadrature amplitude shift keying).

Figure 3:
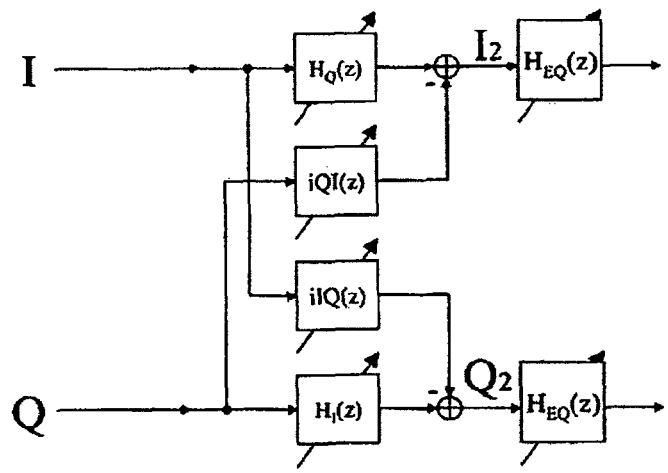

FIG. 3 shows a block diagram of the filtering process to obtain the identification of a single equalizing filter that is identical for both I/Q phases once the coefficients are obtained. This filter is inserted in the input of block 15 of FIG. 1 once the coefficients are obtained.

Figure 4:
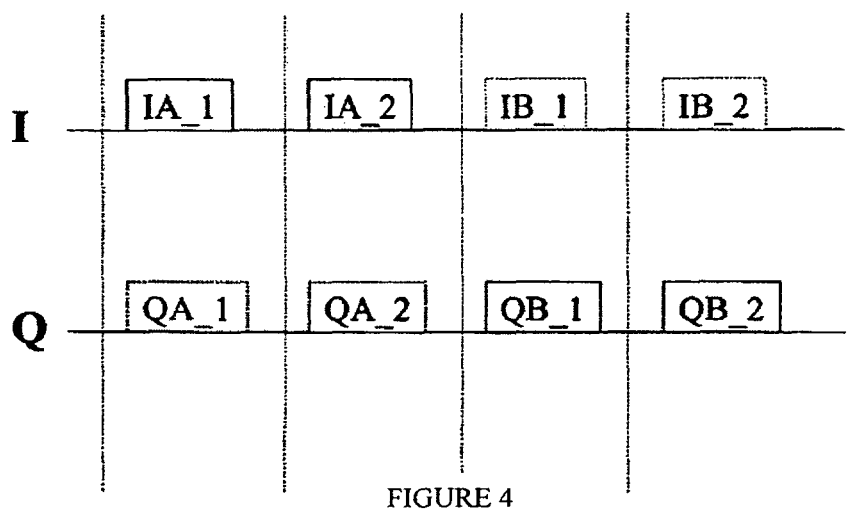

FIG. 4 shows the chronogram describing the reception preamble and the signals received by each of the two quadrature demodulated I/Q phases from which the data are obtained for obtaining the equalizing filter.

PREFERRED EMBODIMENT OF THE INVENTION

Figure 1:
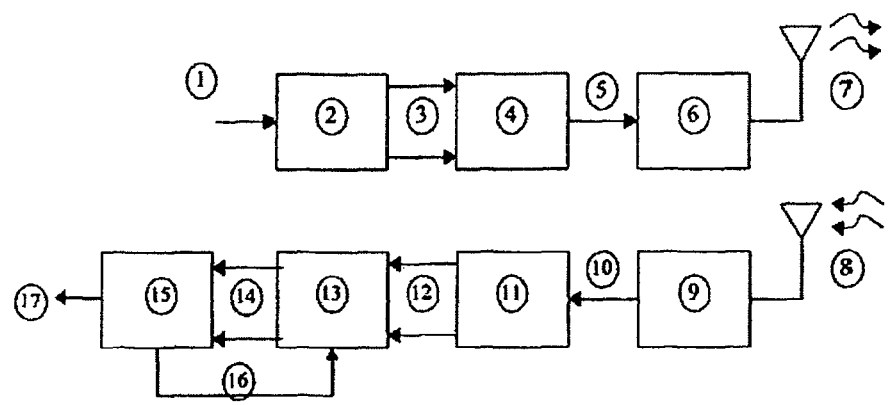
FIG. 1 shows the block diagram of a system of estimating the medium. The different parts forming said system are detailed below.

A possible implementation of this technique applied to obtaining and canceling interference in a radio wave transmitter and receiver is described below. For the purpose of clarity, FIG. 1 schematically shows the implementation. As previously mentioned, this implementation is based on the application of this method to radiofrequency systems. The particular case of pairs of QASK modulated complementary Golay sequences are used for the purpose of simplifying the explanation. The system consists of two well differentiated blocks: the transmission system and the reception system.

The transmission system is responsible for:

Convoluting the input signal (at least four Krönecker deltas) with each of the sequences forming the Golay pairs having length L in the order and phase defined in the preamble of FIG. 2.

Quadrature modulating the two signals resulting from the coding by totaling both phases.

Frequency-converting (up-converter) the quadrature modulated signal to be able to transmit it in the corresponding area of the radioelectric spectrum.

Transmitting the signal to the antenna.

The reception system is responsible for:

Frequency synchronizing and converting (down-converter) the signal received by the antenna.

Obtaining the phase I[n] and quadrature Q[n] components by means of quadrature demodulation.

Correlating both phases by the original sequences in the order and phase defined in the transmission and extracting the coefficients as has been previously defined.

Updating the coefficients of the input filters.

Equalizing the signal, if needed, by means of the identical $H_{eq}$ filter per phase.

The resulting signal of the process contains information on the distortion caused by the medium through which the electromagnetic wave has been propagated in the bandwidth in which it is applied, with a reduction of the thermal noise and of the noise introduced by the different steps of the process proportional to the length L of the complementary sequences used.

The invention claimed is:

1. A method of sending a signal through a transmission medium over a channel using a device comprising a transmitter; the transmitter comprising a pulse generator, a preamble generator block, a quadrature modulator and an upconverter operatively coupled to the preamble generator, and a composition block; the method comprising the steps of:

receiving a pulse from the pulse generator at the preamble generator block;

generating a preamble in response to the pulse with the preamble generator block by using at least one pair of complementary sequences or codes, with A1,B1 being one of the at least one pair and A2,B2 being the other of the at least one pair, with each of the at least one pair of sequences or codes being of length L, and wherein the sequence pairs A1,B1 and A2,B2 are mutually orthogonal;

with the preamble generator block applying codes A1 and A2 to a phase signal I, and thereafter applying codes B1 and B2 to a phase signal Q;

quadrature modulating and upconverting the phase signal I and thereafter the phase signal Q using the quadrature modulator and the upconverter;

with the composition block generating a composed signal from the quadrature modulated and upconverted signals from the quadrature modulator and upconverter; and transmitting the composed signal to the transmission medium over the channel.

2. The method of claim 1, wherein the device further comprises a receiver, the receiver including an antenna operatively connected to a quadrature demodulator and a downconverter, a correlator block, a filter coefficient calculator block, and a coefficient loader; the method further comprising the steps of:

receiving the composed signal with the antenna;

demodulating and downcoverting the composed signal to obtain original phase signal I and original phase signal Q using the quadrature demodulator and the downconverter, wherein the original phase signals I and Q have been distorted by having been transmitted through the transmission medium;

correlating the distorted original phase signals I and Q with the sequences or codes A1,A2, B1, and B2 in the same order as originally applied using the correlator block;

calculating filter coefficients that are generally representative of distortion that is caused by the transmission of signals through the transmission medium from the transmitter to the receiver using the coefficient calculator block; and updating the calculated filter coefficients using the coefficient loader by applying the calculated filter coefficients to a filter block that is then operatively coupled to the quadrature modulator and downconverter block;

wherein the updated filter coefficients allows distortion associated with the transmission medium to be compensated at the receiver.

3. The method of claim 2, further comprising the step of compensating distortion of subsequently received data transmitted to the transmission medium over the channel and received at the receiver based on the updated filter coefficients.

4. The method of claim 2, wherein the preamble comprises four Kronecker deltas.

5. The method of claim 4, wherein each Kronecker delta has a separation of at least length L.

6. The method of claim 2, wherein the transmitter comprises a first digital signal processor, and the receiver comprises a second digital signal processor.

7. The method of claim 1, wherein the at least one pair of complementary sequences or codes A1,B1 form at least one Golay complementary set.

8. The method of claim 1, wherein the at least one pair of complementary sequences or codes A2,B2 form at least one Golay complementary set.

9. The method of claim 1, wherein the transmitter forms a part of a communications device.

10. The method of claim 1, wherein the transmitter emits a SONAR signal.

11. The method of claim 1, wherein the transmitter emits a RADAR signal.

12. The method of claim 1, wherein the transmitter forms a part of a spectrum analyzer.

13. The method of claim 2, wherein the receiver forms a part of a communications device.

14. The method of claim 2, wherein the receiver receives a SONAR signal.

15. The method of claim 2, wherein the receiver receives a RADAR signal.

16. The method of claim 2, wherein the receiver forms a part of a spectrum analyzer.

17. A method of sending a signal through a transmission medium over a channel, the method comprising the steps:

generating a preamble by using at least one pair of complementary sequences or codes, with A1,B1 being one of the at least one pair and A2,B2 being the other of the at least one pair, each of the at least one pair of sequences or codes being of length L, wherein the sequence pairs A1,B1 and A2,B2 are mutually orthogonal;

applying the codes A1 and A2 to a phase signal I, and thereafter applying the codes B1 and B2 to a phase signal Q;

quadrature modulating and upconverting the phase signal I, and thereafter quadrature modulating and upconverting the phase signal Q;

generating a composed signal adapted for transmission to the transmission medium over the channel from the modulated and upconverted phase signals I and Q; and transmitting the composed signal to a transmission medium over a channel using a transmitter.

18. The method of claim 17, further comprising the steps:
receiving the composed signal that has been transmitted using a receiver.

19. The method of claim 18, further comprising the steps:
obtaining the original phase signals I and Q by demodulating and downconverting the received composed signal, wherein the original phase signals I and Q have been distorted by having been transmitted through the transmission medium;

correlating the distorted original phase signals I and Q with the sequences or codes A1,A2, B1, and B2 in the same order as applied during the applying step;

calculating filter coefficients that are generally representative of distortion that is caused by transmission of signals through the transmission medium from the transmitter to the receiver;

loading the calculated filter coefficients into a filter block, wherein the calculated filter coefficients allow distortion of transmitted data associated with the transmission medium to be compensated.

20. The method of claim 19, wherein the preamble comprises four Kronecker deltas, each Kronecker delta having a separation of at least length L, wherein at least one of the pair of complementary sequences or codes A1,B1 and the pair of complementary sequences or codes A2,B2 form a Golay complementary set.

* * * * *